(12) United States Patent
Toyoda et al.

(10) Patent No.: US 10,785,410 B2
(45) Date of Patent: Sep. 22, 2020

(54) IMAGE PROCESSING DEVICE, IMAGE PROCESSING METHOD, AND RECORDING MEDIUM WHICH RECORDS IMAGE PROCESSING PROGRAM FOR GENERATING A SYNTHESIS IMAGE FILE

(71) Applicant: OLYMPUS CORPORATION, Hachioji-shi, Tokyo (JP)

(72) Inventors: Tetsuya Toyoda, Hachioji (JP); Tatsuya Kino, Kodaira (JP); Takuya Matsunaga, Akiruno (JP); Hideaki Yoshida, Hachioji (JP); Kazuhiko Osa, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 63 days.

(21) Appl. No.: 16/169,655

(22) Filed: Oct. 24, 2018

(65) Prior Publication Data
US 2019/0124261 A1    Apr. 25, 2019

(30) Foreign Application Priority Data
Oct. 25, 2017    (JP) .................................. 2017-206249

(51) Int. Cl.
| H04N 5/76 | (2006.01) |
| H04N 5/232 | (2006.01) |
| G03B 37/00 | (2006.01) |
| G02B 13/06 | (2006.01) |
| G03B 37/02 | (2006.01) |
| G03B 7/00 | (2014.01) |

(52) U.S. Cl.
CPC ......... *H04N 5/23238* (2013.01); *G02B 13/06* (2013.01); *G03B 37/00* (2013.01); *G03B 37/02* (2013.01); *H04N 5/23293* (2013.01); *G03B 7/00* (2013.01); *G03B 2206/004* (2013.01)

(58) Field of Classification Search
CPC .................................................. H04N 5/2356
See application file for complete search history.

(56) References Cited

U.S. PATENT DOCUMENTS

| 2007/0002372 A1* | 1/2007 | Sekizawa ............. G11B 27/034 |
| | | 358/1.15 |
| 2009/0091612 A1* | 4/2009 | Sekizawa ............... G03B 35/18 |
| | | 348/43 |
| 2012/0163705 A1* | 6/2012 | Yoshida .................... G06T 1/00 |
| | | 382/154 |

FOREIGN PATENT DOCUMENTS

JP    2015156523 A    8/2015

OTHER PUBLICATIONS

Office Action issued in corresponding Chinese Patent Application No. 201811248845.7 dated Jul. 1, 2020, consisting of 9 pages (English Translation Provided).

* cited by examiner

*Primary Examiner* — Gary C Vieaux
(74) *Attorney, Agent, or Firm* — Volpe and Koenig, P.C.

(57) ABSTRACT

An image processing device includes a processing circuit. The processing circuit acquires a plurality of images, generates a synthesis image by synthesizing the images, generates a synthesis image file in which additional information indicative of a relationship between the images is recorded together with the synthesis image, and records the synthesis image file in a recording medium.

8 Claims, 17 Drawing Sheets

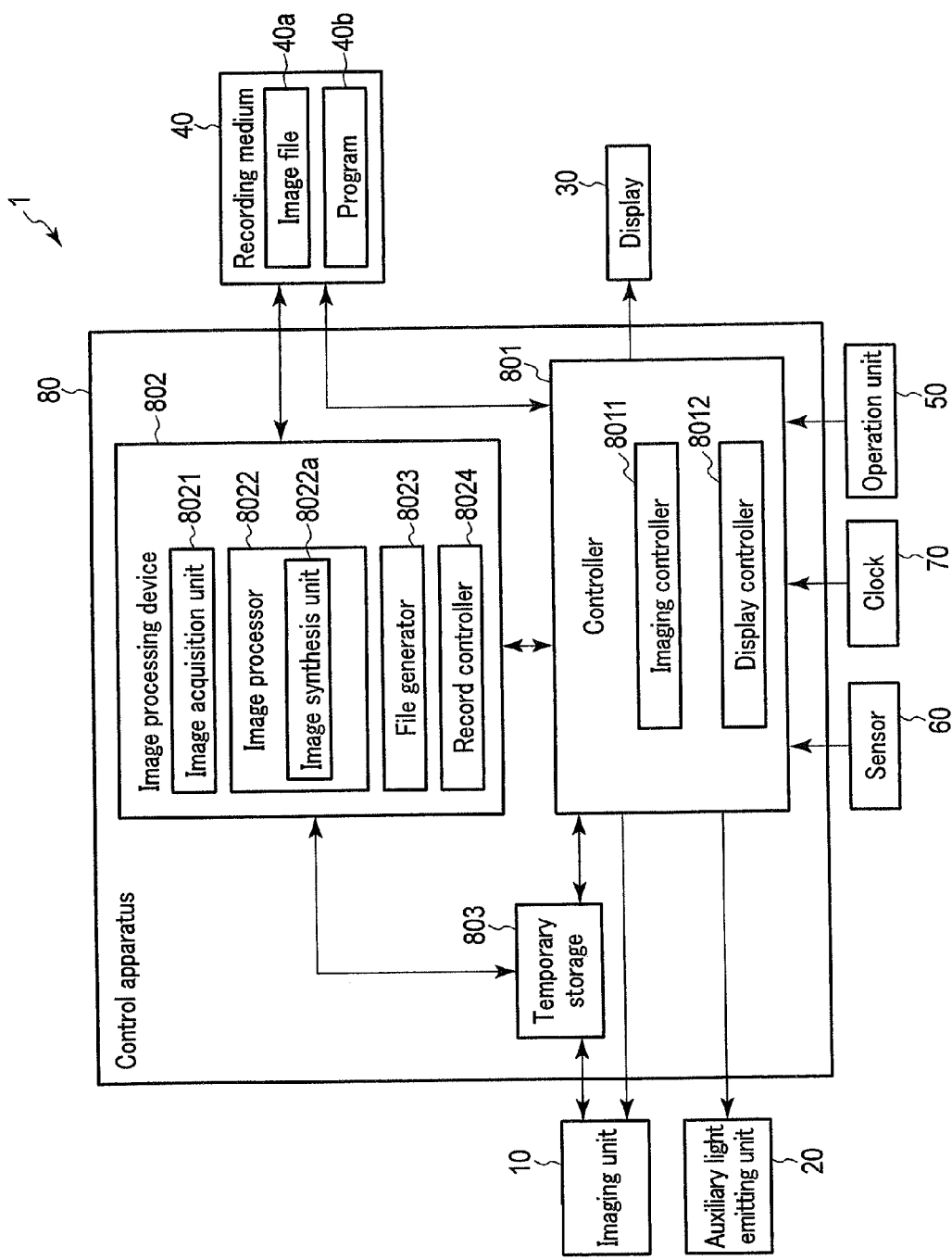
F I G. 1

|  | Serial imaging | Independent imaging |
|---|---|---|
| Identical | HDR<br>Depth synthesis<br>Field sequential method | Fluorescence analysis |
| Different | Panorama<br>Multiple exposure | Composite photograph generation |

FIG. 2

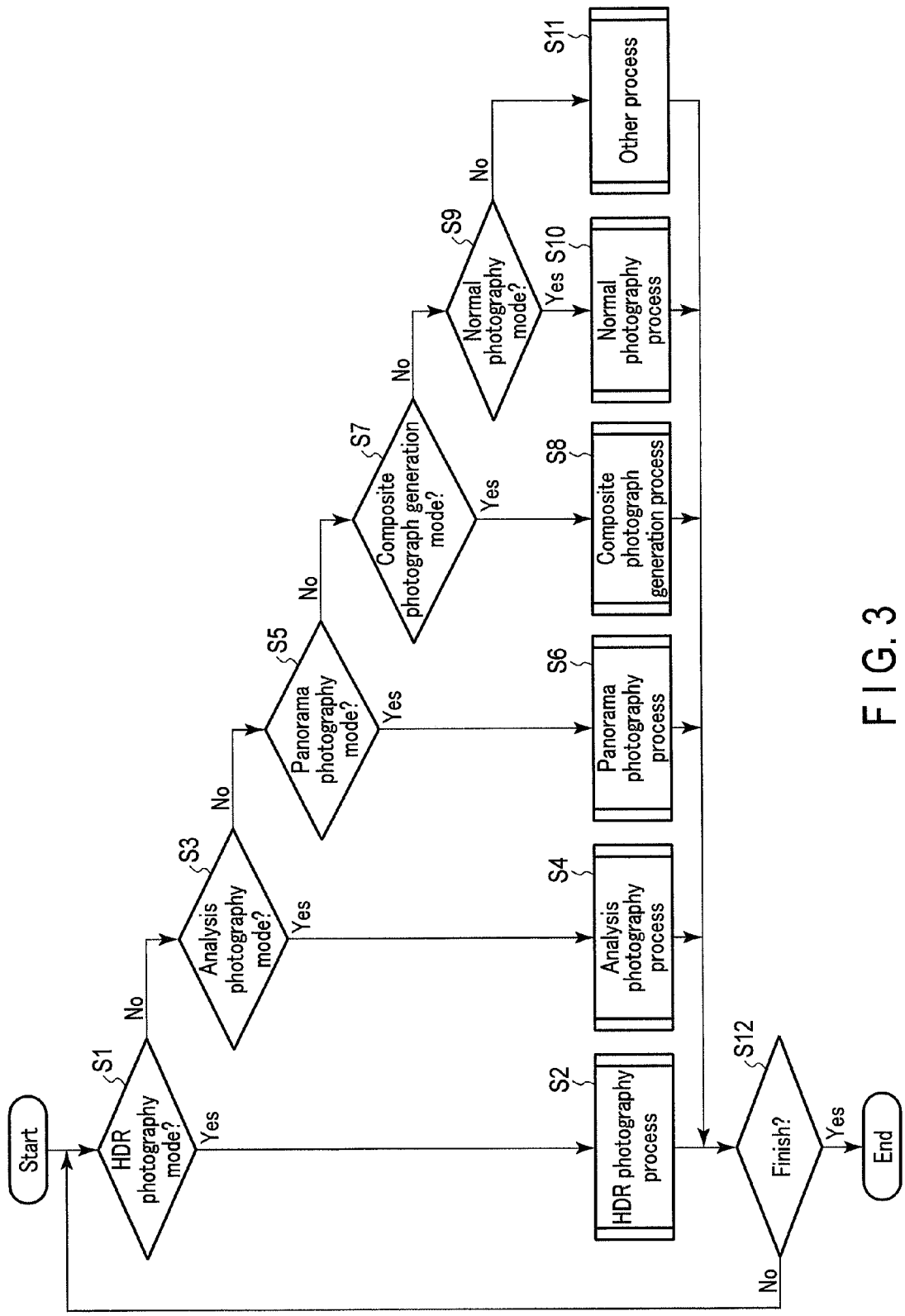
F I G. 3

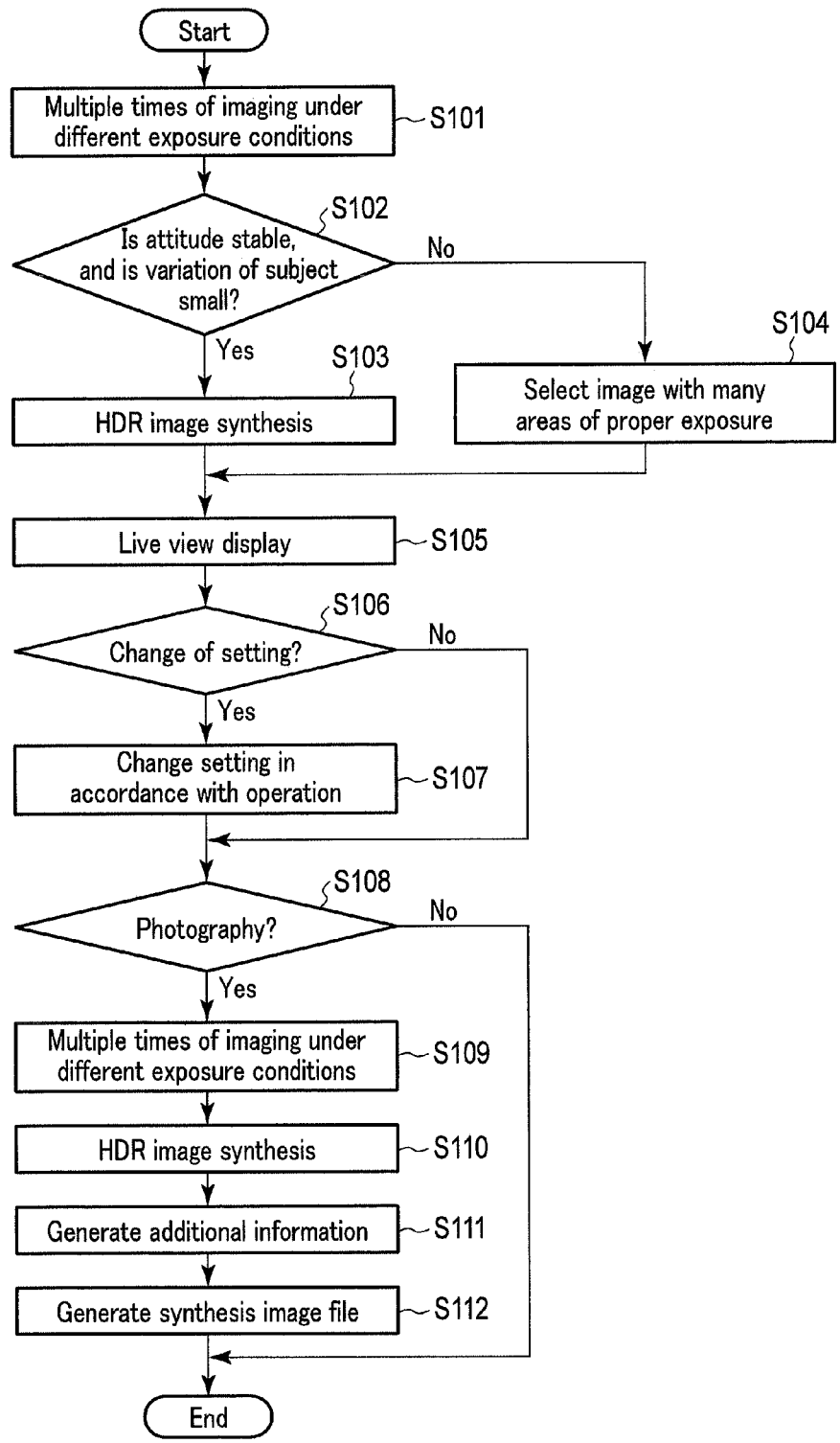
F I G. 4

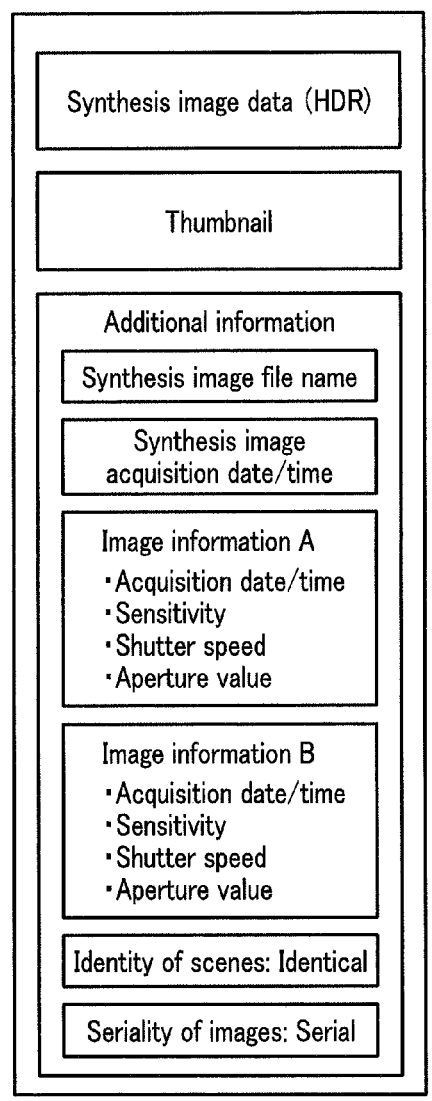
F I G. 7

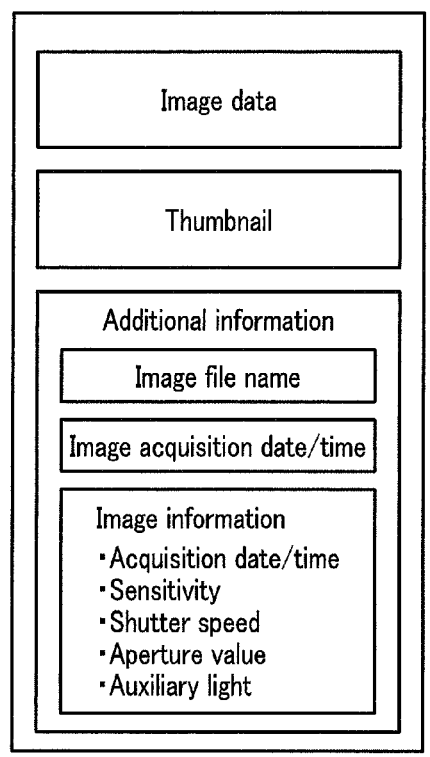
F I G. 9A

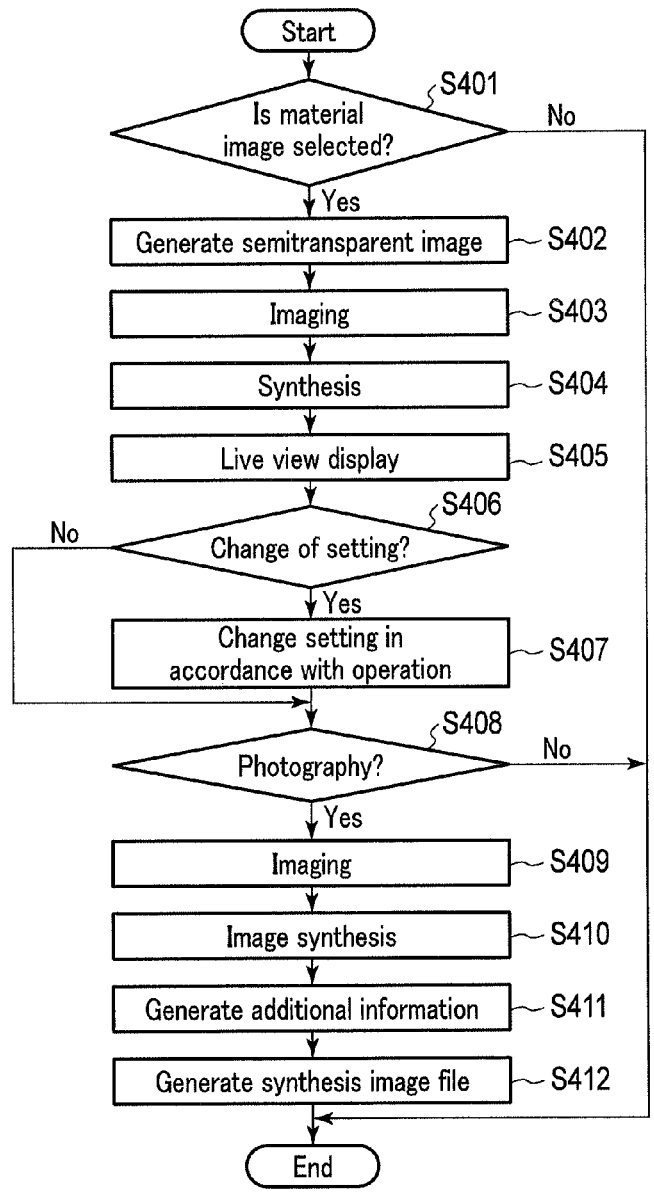
F I G. 13

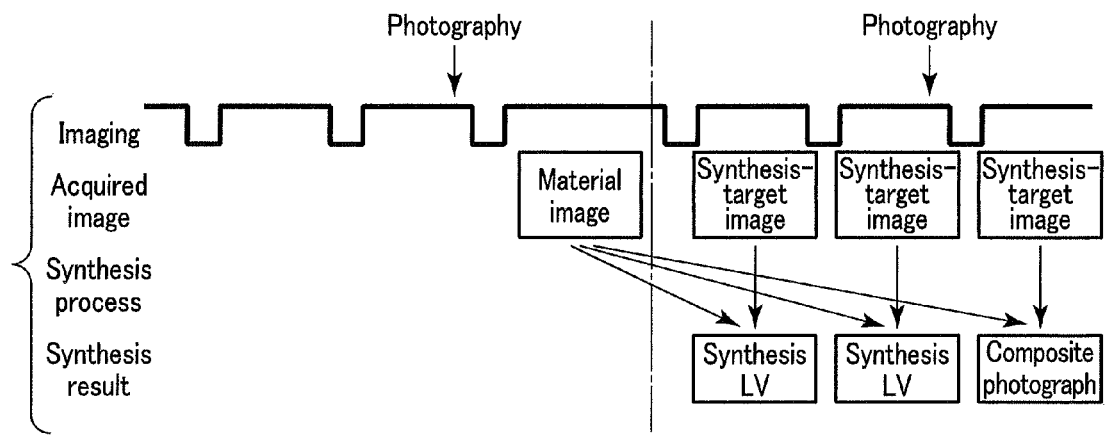
F I G. 14
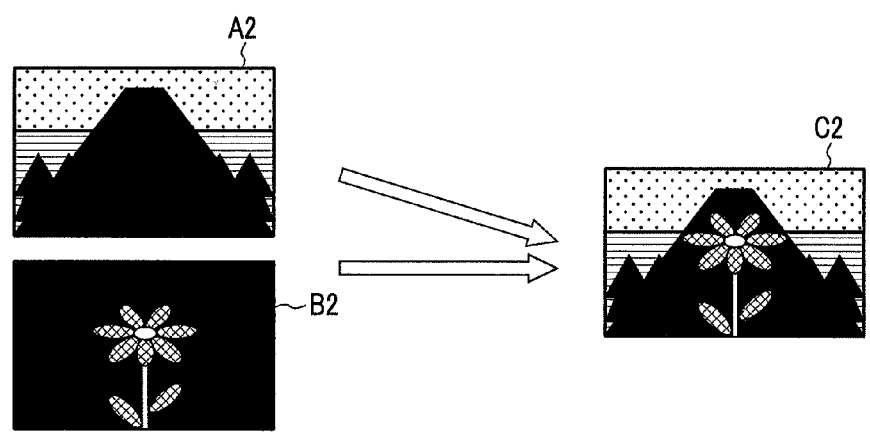
F I G. 15

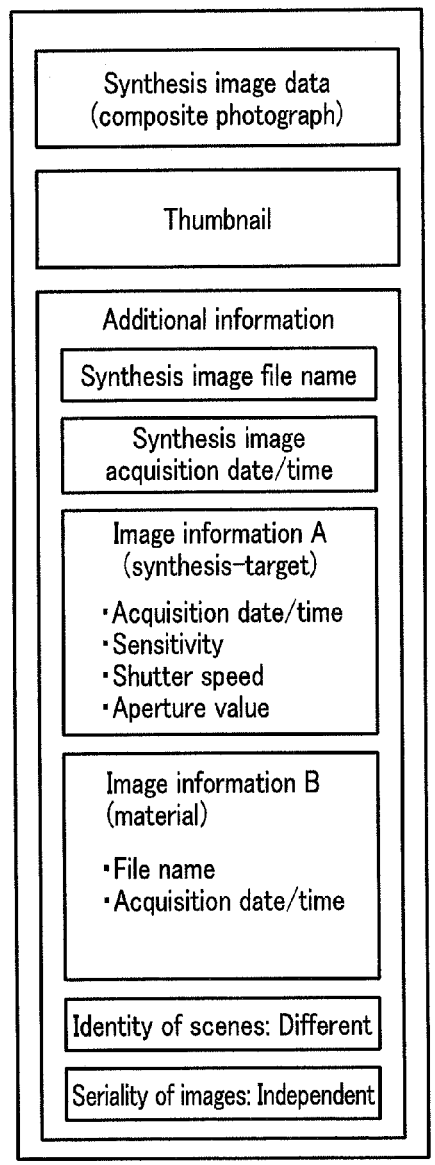
F I G. 16

IMAGE PROCESSING DEVICE, IMAGE PROCESSING METHOD, AND RECORDING MEDIUM WHICH RECORDS IMAGE PROCESSING PROGRAM FOR GENERATING A SYNTHESIS IMAGE FILE

CROSS-REFERENCE TO RELATED APPLICATIONS

This application is based upon and claims the benefit of priority from the prior Japanese Patent Application No. 2017-206249, filed Oct. 25, 2017, the entire contents of which are incorporated herein by reference.

BACKGROUND OF THE INVENTION

1. Field of the Invention

The present invention relates to an image processing device, an imaging processing method, and a recording medium which records an image processing program.

2. Description of the Related Art

There are known various image synthesis techniques of synthesizing a plurality of images. For example, an image processing device of Jpn. Pat. Appln. KOKAI Publication No. 2015-156523 generates a panorama image by panorama-synthesizing a plurality of images acquired by multiple times of imaging while an imaging direction is being varied. When a generated panorama image is an around-view panorama image, this image processing device associates and records the panorama image and information which indicates that this panorama image is an around-view panorama image.

BRIEF SUMMARY OF THE INVENTION

According to a first aspect of the invention, there is provided an image processing device comprising a processing circuit configured to: acquire a plurality of images; generate a synthesis image by synthesizing the images; generate a synthesis image file in which additional information indicative of a relationship between the images is recorded together with the synthesis image; and record the synthesis image file in a recording medium.

According to a second aspect of the invention, there is provided an image processing method comprising: acquiring a plurality of images; generating a synthesis image by synthesizing the images; generating a synthesis image file in which additional information indicative of a relationship between the images is recorded together with the synthesis image; and recording the synthesis image file in a recording medium.

According to a third aspect of the invention, there is provided a computer-readable, non-transitory recording medium which records an image processing program for causing a computer to execute: acquiring a plurality of images; generating a synthesis image by synthesizing the images; generating a synthesis image file in which additional information indicative of a relationship between the images is recorded together with the synthesis image; and recording the synthesis image file in a recording medium.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a configuration of an imaging device which is an example in which an image processing device according to an embodiment of the present invention is applied.

FIG. 2 is a view illustrating, in an associated manner, the kind of image synthesis and the relationship of images used for image synthesis.

FIG. 3 is a flowchart illustrating an operation of an imaging device according to an embodiment of the invention.

FIG. 4 is a flowchart illustrating a High Dynamic Range (HDR) photography process.

FIG. 7 is a view illustrating an example of a synthesis image file which is generated by the HDR photography process.

FIG. 9A is a view illustrating an example of an image file which is generated by the analysis photography process.

FIG. 13 is a flowchart illustrating a composite photograph generation process.

FIG. 14 is a timing chart during the composite photograph generation process.

FIG. 15 is a view illustrating an example of image synthesis for composite photograph generation.

FIG. 16 is a view illustrating an example of a synthesis image file which is generated by the composite photograph generation process.

DETAILED DESCRIPTION OF THE INVENTION

Figure 5:
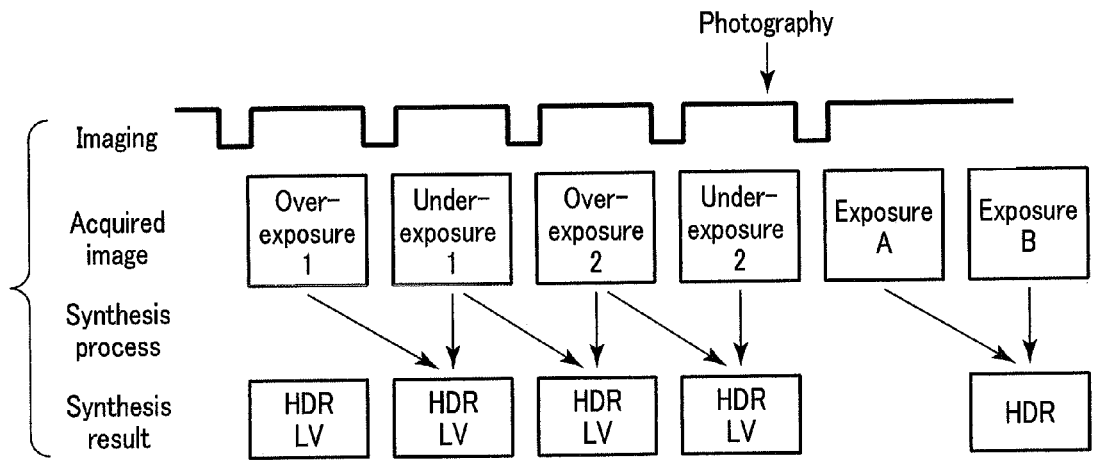
FIG. 5 is a timing chart during the HDR photography process.

Hereinafter, embodiments of the present invention will be described with reference to the accompanying drawings. FIG. 1 is a block diagram illustrating a configuration of an imaging device which is an example in which an image processing device according to an embodiment of the present invention is applied. An imaging device 1 illustrated in FIG. 1 includes an imaging unit 10, an auxiliary light emitting unit 20, a display 30, a recording medium 40, an operation unit 50, a sensor 60, a clock 70, and a control apparatus 80. The imaging device 1 is, for example, a digital camera. The imaging device 1 may be a smartphone, a tablet terminal or the like, which includes an imaging function. Further, the imaging device 1 may be an endoscope device, a microscope device, an analysis device or the like, which includes an imaging function.

The imaging unit 10 images an object to acquire data of an image relating to the object. The imaging unit 10 includes a lens and an imaging element. The lens focuses a light flux from an object (not shown) on a light-receiving surface of the imaging element. The lens may include a zoom lens and a focus lens. The imaging element is, for example, a CMOS sensor, and converts the light flux received by the light-receiving surface to an electric signal (image signal). In addition, the imaging element also executes a preprocess which amplifies the image signal, and digitizes the image signal, thereby generating the data of the image.

The auxiliary light emitting unit 20 emits auxiliary light to the object. The auxiliary light is used, for example, for fluorescence observation of the object. In this case, the wavelength of auxiliary light is made to correspond to the excitation wavelength of a fluorescent substance which is added to the object. Besides, the auxiliary light is also used as illumination light in a case in which the object is dark. The auxiliary light emitting unit 20 is composed of an LED light source, a semiconductor laser light source, etc.

The display 30 is, for example, a liquid crystal display, or an organic EL display, and displays various kinds of images.

The recording medium 40 is composed of, for example, a flash memory. An image file 40a is recorded in the recording medium 40. In addition, various kinds of programs 40b, which are executed in the control apparatus 80, are recorded in the recording medium 40.

The operation unit 50 includes various operation members for a user to execute various operations on the imaging device 1. The operation members include mechanical operation members such as a button and a switch, and a touch panel.

The sensor 60 includes various sensors, such as an attitude sensor, a GPS receiver, an azimuth sensor, a temperature sensor, an atmospheric pressure sensor, and a humidity sensor. The attitude sensor is composed of, for example, an acceleration sensor, and detects the attitude of the imaging device 1. The GPS receiver detects a current position of the imaging device 1 by communication with an artificial satellite or the like. The azimuth sensor is composed of, for example, an electronic compass, and detects the azimuth of the imaging device 1. The temperature sensor is composed of, for example, a thermistor, and detects the ambient temperature of the imaging device 1. The atmospheric pressure sensor detects the ambient atmospheric pressure of the imaging device 1. The humidity sensor detects the ambient humidity of the imaging device 1. The information detected by the sensor 60 are used for controlling the imaging device 1, or recorded as additional information of the image file.

The clock 70 measures time. The time measured by the clock 70 is used for controlling the imaging device 1, or recorded as additional information of the image file.

The control apparatus 80 is composed of, for example, hardware including a CPU and a memory. The control apparatus 80 includes a controller 801, an image processing device 802 and a temporary storage 803.

The controller 801 is composed of, for example, a CPU, and controls the operation of the entirety of the imaging device 1 including the control apparatus 80. The controller 801 includes an imaging controller 8011 and a display controller 8012. The imaging controller 8011 controls acquisition (imaging) of an image by the imaging unit 10. The display controller 8012 controls display of an image on the display 30. The imaging controller 8011 and display controller 8012 are realized by using, for example, software. Needless to say, these may be realized by using hardware.

The image processing device 802 includes, for example, processing circuits which execute various kinds of image processes. The image processing device 802 includes an image acquisition unit 8021, an image processor 8022, a file generator 8023 and a record controller 8024. The image acquisition unit 8021 acquires an image from the outside of the image processing device 802. For example, the image acquisition unit 8021 reads out an image stored in the temporary storage 803. Besides, the image acquisition unit 8021 may include a communication circuit, and may be configured to acquire data of an image from an external device of the imaging device 1. The image processor 8022 applies various image processes to the image acquired via the image acquisition unit 8021. The image processes include, for example, processes necessary for display or recording, such as a white balance correction process, a gamma correction process, a color correction process, a noise reduction process and a resize process. In addition, the image processes include a process necessary for recording, such as a compression process. Furthermore, the image processor 8022 includes an image synthesis unit 8022a. The image synthesis unit 8022a generates a synthesis image by synthesizing a plurality of images. As will be described later in detail, the image synthesis unit 8022a is configured to perform different image syntheses in accordance with a photography mode at a time of photography. The file generator 8023 generates an image file of, e.g. a DCF format, based on the image generated by the image processor 8022. The image file is generated by recording additional information composed of metadata of an Exif format or the like, together with the data of the image. The record controller 8024 records the image file generated by the file generator 8023 in the recording medium 40.

The temporary storage 803 is, for example, a memory such as a DRAM, and temporarily stores various data such as data of an image and processing data of the controller 801 and image processing device 802. In the present embodiment, since image synthesis is performed, it is preferable that the temporary storage 803 is configured to be capable of storing the data of the number of images, which are used for image synthesis.

Next, the operation of the image processing device 802 of the present embodiment will be described. The image processing device 802 in the embodiment records information indicative of a relationship between images, which were used for image synthesis when the image synthesis was performed, as additional information in a synthesis image file. FIG. 2 is a view illustrating, in an associated manner, the kind of image synthesis and the relationship of images used for image synthesis. In this embodiment, image synthesis is classified according to (1) whether images used for image synthesis are acquired during serial imaging from a user's photography instruction, and (2) whether images used for image synthesis are acquired by imaging of an identical scene (an identical imaging range). The relationships mentioned here in particular are a relationship between objects included in the images and a relationship relating to an acquisition timing of the images. These relationships may be set as additional information. In addition, the relationship between objects included in the images includes a case in which the identity of the object is important (a case of enriching image information of an identical object), and a case of photographing different objects in an identical image and enriching the image by a plurality of objects. The presence of additional information for such division of cases makes it easier to clearly indicate the intent of the image. Such data serves as a reference when a machine or the like learns images. In addition, as regards the timing, information as to whether an image is an independent image synthesized during continuous exposure (photoelectric conversion), or a synthesized image acquired by multiple times of independent exposure (photoelectric conversion) may serve as a reference for photography in the future. In the case of the continuous exposure, switching between various imagings needs to be executed during the same exposure, and the change of various elements involved in imaging needs to be made relatively quickly. Besides, in the case of multiple times of exposure, repeated operations are needed, and in the case of an identical object, devices are needed to make the object unchanged. Thus, even if a synthesis image acquired by continuous exposure and a synthesis image acquired by multiple times of exposure are the same synthesis image, points to be noted when the same image is acquired once again are greatly different. In this manner, the additional information for discrimination greatly serves as a reference for a reproducibility check of imaging, and for acquisition of a similar image. Moreover, the additional information for discrimination is also important for analysis, classification, etc. of images, and may be used, where necessary, for selection, etc. of equipment for imaging. Since an image has a large amount of information and is understood at a glance from the visibility of the image, many people who viewed the image wish to acquire and search for similar images. To meet such a demand, the presence of the additional information is desirable. When an identical object is present at an identical position, the expression "identical object" can be the expression "same position" (can also be a concept of an object at an identical position, or imaging at an identical position). In this case, the additional information covers the position and time, and a considerable quantity of information can be simplified and incorporated in image-related information. Accordingly, in the case of a synthesis image as an image for which a plurality of images are acquired, the convenience at a time of utilizing the image is enhanced by recording the additional information indicating the relationship between the acquisition position and acquisition timing of each of images before synthesis. The additional information can also be expressed as a general physical conditional change of the difference in photography condition, and, in other words, it can be said that the relationship between images constituting the synthesis image is recorded.

For example, HDR image synthesis is a process of generating an image of a wide dynamic range which cannot be realized by a single image, by synthesizing images acquired by imaging an identical scene while varying an exposure amount. Accordingly, the images used for HDR image synthesis are acquired during serial imaging, and are acquired by imaging an identical scene. Processes having similar properties to the HDR image synthesis are, for example, a depth synthesis process and a field sequential image synthesis process. The depth synthesis process is a process of generating an image in a state in which objects in plural areas (or all areas) of an image are in focus, by synthesizing images acquired by imaging an identical scene while varying a focal position. The field sequential image synthesis process is a process which is used, for example, in an endoscope. The field sequential image synthesis process is a process of generating a color image by dividing one frame for generating one color image into a plurality of fields, radiating illumination light of a single color, which is different from field to field, to an object, and synthesizing images acquired from an imaging element in a sequential order of fields. Hereinafter, the image synthesis of plural images acquired during serial imaging of an identical scene, such as the HDR image synthesis process, depth synthesis process and field sequential image synthesis process, is referred to as "A-type process". In the "serial imaging" exemplified here, attention is paid to temporal continuity or the like. Specifically, in the "serial imaging", a condition is assumed in which imaging is repeated or successive imaging is executed in accordance with a one-time imaging operation or a one-time release operation. In addition, as the additional information of the A-type process, it may be possible to additionally record information indicating that original images used for image synthesis are not different files from a synthesis image, or information indicating that the original images cannot be referred to as different files. By this information being recorded, it is possible to save the work of searching for original images used for image synthesis, which is not left.

In addition, for example, in fluorescence analysis, a plurality of kinds of phosphors are added to an object that is an observation target, and auxiliary light is radiated such that fluorescence unique to each phosphor is obtained. In this case, one fluorescence image is generated with respect to radiation of each fluorescence. The generated fluorescence images are synthesized as needed. Accordingly, the images used for image synthesis in the fluorescence analysis are acquired by independent imaging, and are acquired by imaging of an identical scene. Hereinafter, the image synthesis of images acquired by the independent imaging of an identical scene, such as image synthesis at a time of fluorescence analysis, is referred to as "B-type process". The "independent imaging" in this case represents imaging which requires, in every imaging, a work involving various parameter settings, illumination setting, and other auxiliary operations, etc. On the other hand, imaging, in which these settings or the like are automated and sequentially performed, is classified into "A-type process". In addition, as the additional information of the B-type process, it may be possible to additionally record information indicating that original images used for image synthesis are different files from a synthesis image. By this information being recorded, it is possible to refer to original images used for image synthesis.

For example, in panorama synthesis, an image of a wider view field than a normal view field is generated by connecting a plurality of images which are successively captured while the user is moving the imaging device 1. Accordingly, images used for panorama synthesis are acquired during serial imaging and are acquired by imaging of different scenes. A process having similar properties to the panorama synthesis is, for example, a synthesis process of images acquired by multiple exposure with individual imaging ranges being varied. The multiple exposure is a process of synthesizing images acquired by a plurality of imagings (exposures). Thus, the images acquired by the multiple exposure in the case in which the individual imaging ranges are varied are acquired during serial imaging like the panorama image, and are acquired by imaging of different scenes. Hereinafter, image synthesis of images acquired by serial imaging of different scenes, such as the panorama image synthesis, is referred to as "C-type process". Note that in the case of the multiple exposure, the individual imaging ranges may also be made identical. The synthesis process of multiple-exposure images in this case is the A-type process like the HDR image synthesis process. As described above, in the "serial imaging" exemplified here, attention is paid to temporal continuity or the like. Specifically, in the "serial imaging", a condition is assumed in which imaging is repeated or successive imaging is executed in accordance with a one-time imaging operation or a one-time release operation. In addition, as the additional information of the C-type process, it may be possible to additionally record information indicating that original images used for image synthesis are not different files from a synthesis image, or information indicating that the original images cannot be referred to as different files. By this information being recorded, it is possible to save the work of searching for an original image used for image synthesis, which is not left.

For example, in a generation process of a composite photograph, a material image, which is discretionarily chosen by a user, is synthesized with another synthesis-target image, and thereby a synthesis image is generated. In this case, the synthesis-target image, which is a basic image of synthesis, and the material image, which is used for synthesis, may be or may not be images acquired by imaging of an identical scene, and may be or may not be acquired during serial imaging. Hereinafter, image synthesis of images acquired by independent imaging of different scenes is referred to as "D-type process". As described above, the "independent imaging" in this case represents imaging which requires, in every imaging, a work involving various parameter settings, illumination setting, and other auxiliary operations, etc. On the other hand, imaging, in which these settings or the like are automated and sequentially performed, is classified into "C-type process". In addition, as the additional information of the D-type process, it may be possible to additionally record information indicating that original images used for image synthesis are a different file from a synthesis image. By this information being recorded, it is possible to refer to original images used for image synthesis.

In this manner, in the present embodiment, the image syntheses are classified into the A-type process, B-type process, C-type process and D-type process. In addition, in this embodiment, different additional information pieces are recorded in accordance with the respective classifications of image synthesis. By recording such additional information, the relationship of images used for image synthesis can be presented to, for example, the user. For example, by informing the user of the presence of a material image which was used for generating a composite photograph, the user can generate a new composite photograph by using this material image. In this manner, the range of uses of images used for image synthesis can be broadened.

Hereinafter, a concrete operation of the image processing device 802 of the present embodiment will be described. FIG. 3 is a flowchart illustrating an operation of the imaging device 1 according to the present embodiment. The operation of FIG. 3 is controlled mainly by the controller 801. Here, the imaging device 1 includes, as photography modes, an HDR photography mode as a photography mode for executing the above-described A-type process, an analysis photography mode as a photography mode for executing the B-type process, a panorama photography mode as a photography mode for executing the C-type process, a composite photograph generation mode as a photography mode for executing the D-type process, and a normal photography mode which does not involve a synthesis process. The selection of the photography mode is executed by, for example, a user's operation of the operation unit 50.

The operation of FIG. 3 is started, for example, when the imaging device 1 is powered on. In step S1, the controller 801 determines whether the photography mode is the HDR photography mode or not. In step S1, if it is determined that the photography mode is the HDR photography mode, the process advances to step S2. In step S1, if it is determined that the photography mode is not the HDR photography mode, the process advances to step S3.

In step S2, the controller 801 executes an HDR photography process. After the HDR photography process, the process advances to step S12. The HDR photography process will be described later in detail.

In step S3, the controller 801 determines whether the photography mode is the analysis photography mode or not. In step S3, if it is determined that the photography mode is the analysis photography mode, the process advances to step S4. In step S3, if it is determined that the photography mode is not the analysis photography mode, the process advances to step S5.

In step S4, the controller 801 executes an analysis photography process. After the analysis photography process, the process advances to step S12. The analysis photography process will be described later in detail.

In step S5, the controller 801 determines whether the photography mode is the panorama photography mode or not. In step S5, if it is determined that the photography mode is the panorama photography mode, the process advances to step S6. In step S5, if it is determined that the photography mode is not the panorama photography mode, the process advances to step S7.

In step S6, the controller 801 executes a panorama photography process. After the panorama photography process, the process advances to step S12. The panorama photography process will be described later in detail.

In step S7, the controller 801 determines whether the photography mode is the composite photograph generation mode or not. In step S7, if it is determined that the photography mode is the composite photograph generation mode, the process advances to step S8. In step S7, if it is determined that the photography mode is not the composite photograph generation mode, the process advances to step S9.

In step S8, the controller 801 executes a composite photograph generation process. After the composite photograph generation process, the process advances to step S12. The composite photograph generation process will be described later in detail.

In step S9, the controller 801 determines whether the photography mode is the normal photography mode or not. In step S9, if it is determined that the photography mode is the normal photography mode, the process advances to step S10. In step S9, if it is determined that the photography mode is not the normal photography mode, the process advances to step S11.

In step S10, the controller 801 executes a normal photography process. A brief description is given of the normal photography process. In the normal photography process, live view display is first executed. In the live view display, repeated imaging is performed, and image processes for display are executed for images acquired by the repeated imaging. The images, on which the image processes for display is executed, are successively displayed on the display 30. If a photography instruction is given by the user during the live view display, imaging for recording is performed, for example, based on the sensitivity, shutter speed and aperture value, which is set in accordance with the result of immediately preceding AE. Based on an image acquired by this imaging, an image file is generated. This image file is recorded in the recording medium 40, and the normal photography process is finished. After this normal photography process, the process advances to step S12.

In step S11, the controller 801 executes other processes. The other processes include a process of playing back image files, a process of communicating image files, etc. A description of the other processes is omitted. After the other processes, the process advances to step S12.

In step S12, the controller 801 determines whether or not to finish the operation. For example, it is determined that the operation is to be finished when the imaging device 1 is powered off by the user's operation of the operation unit 50. In step S12, if it is determined that the operation is not finished, the process returns to step S1. In step S12, if it is determined that the operation is to be finished, the process of FIG. 3 is terminated.

Next, the HDR photography process will be described. FIG. 4 is a flowchart illustrating the HDR photography process. In addition, FIG. 5 is a timing chart during the HDR photography process. FIG. 5 shows, from above, the timing of imaging, an image acquired by each imaging, a combination of images used for image synthesis, and HDR images acquired by image synthesis.

In step S101 after the start of the HDR photography process, the controller 801 controls the imaging unit 10 so as to execute multiple times of imaging under different exposure conditions for HDR live view display. After the end of multiple times of imaging, the process advances to step S102. As illustrated in FIG. 5, in the HDR photography process, a plurality of times (two times in FIG. 5) of imaging are repeated under different exposure conditions until photography is instructed. In the example of FIG. 5, imaging of "over-exposure", which is an exposure condition of over-exposure relative to proper exposure, and imaging of "under-exposure", which is an exposure condition of under-exposure relative to proper exposure, are repeatedly executed. The imaging of over-exposure is, for example, imaging with a lower shutter speed than a shutter speed at which proper exposure is obtained. The imaging of under-exposure is, for example, imaging with a higher shutter speed than the shutter speed at which proper exposure is obtained. A variation amount of the shutter speed for the proper exposure is, for example, a fixed value. Alternatively, a variation amount of the shutter speed for the proper exposure is, for example, a value which is set in a setting change which will be described later.

In step S102, the controller 801 determines whether the attitude of the imaging device 1 is stable or not, based on an output from the attitude sensor of the sensor 60, and the controller 801 also determines whether a variation of a subject (object) in images acquired by multiple times of imaging is small or not. For example, when outputs of the attitude sensor during multiple times of imaging are substantially constant, it is determined that the attitude of the imaging device 1 is stable. In addition, when results of image matching of the object among images acquired by multiple times of imaging are substantially constant, it is determined that a variation of the subject in the images acquired by multiple times of imaging is small. In step S102, if it is determined that the attitude of the imaging device 1 is stable and that the variation of the subject is small, the process advances to step S103. In step S102, if it is determined that the attitude of the imaging device 1 is not stable, or that the variation of the subject is large, the process advances to step S104.

Figure 6:
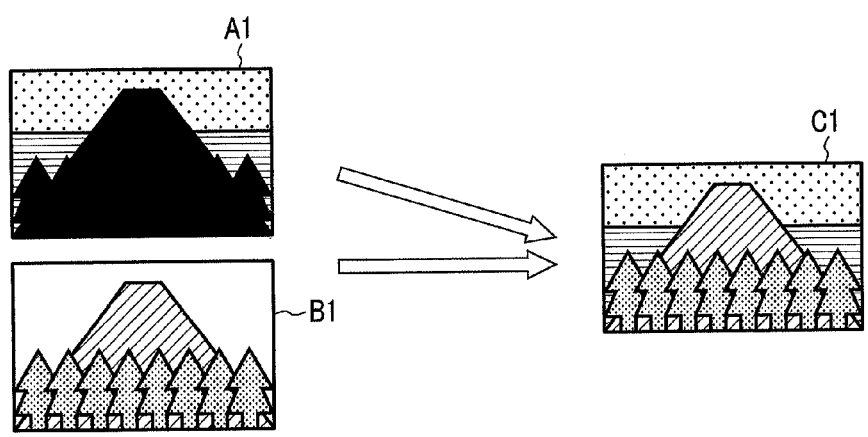
FIG. 6 is a view illustrating an example of HDR image synthesis.

In step S103, the controller 801 requests the image processing device 802 to execute HDR image synthesis of the images acquired by multiple times of imaging. Responding to the request, the image synthesis unit 8022a of the image processing device 802 executes HDR image synthesis. Thereafter, the process advances to step S105. For example, the image synthesis unit 8022a generates an HDR live view (LV) image by executing HDR image synthesis with a combination of an image of over-exposure 1 and an image of under-exposure 1, and generates an HDRLV image by executing HDR image synthesis with a combination of an image of over-exposure 2 and an image of under-exposure 2. FIG. 6 is a view illustrating an example of HDR image synthesis. In the HDR image synthesis, synthesis is executed for replacing a blocked-up shadow area in an under-exposure image A1 with a corresponding area in an over-exposure image B1, or synthesis is executed for replacing a blown-out highlight area in the over-exposure image B1 with a corresponding area in the under-exposure image A1. By this HDR image synthesis, an HDRLV image C1 with a greater dynamic range than the image A1 and image B1 is generated.

In step S104, the controller 801 selects, from among the images acquired by multiple times of imaging, an image having the greatest number of areas of proper exposure. Thereafter, the process goes to step S105. If the attitude of the imaging device 1 is not stable or if the variation of the subject (object) is large, there is a high possibility that an image obtained as a result of HDR image synthesis becomes more unnatural than an image acquired without HDR image synthesis. Thus, when the attitude of the imaging device 1 is not stable or when the variation of the subject (object) is large, HDR image synthesis is prevented from being executed.

In step S105, the controller 801 executes live view display. In the live view display, the controller 801 requests the image processing device 802 to execute image processes for display. Responding to the request, the image processor 8022 of the image processing device 802 executes the image processes for display, such as a white balance correction process, a gamma correction process, a color correction process, a noise reduction process and a resize process. When an HDR image is being generated, the image processor 8022 executes image processes on the HDR image. On the other hand, when an HDR image is not being generated, the image processor 802 executes image processes on the image selected by the controller 801. After the image processes, the controller 801 causes the display 30 to display the image on which the image processes were executed. After the live view display, the process advances to step S106.

In step S106, the controller 801 determines whether an instruction to change the setting is given by the user's operation of the operation unit 50. For example, when an operation member for the change of setting, such as a menu button, is operated, it is determined that the instruction to change the setting is given. In step S106, if it is determined that the instruction to change the setting is given, the process advances to step S107. In step S106, if it is determined that the instruction to change the setting is not given, the process advances to step S108.

In step S107, the controller 801 changes the setting relating to HDR photography in accordance with the user's operation of, the operation unit 50. Thereafter, the process advances to step S108. The setting relating to HDR photography includes setting of an exposure condition, setting of the number of times of imaging (the number of syntheses), and setting of recording of an BDR image. The setting of recording an HDR image includes, for example, setting as to whether or not to record, as an image file, each of the original images which are used for HDR image synthesis.

In step S108, the controller 801 determines whether or not to execute photography. For example, when an instruction for photography is given by the user's operation of the operation unit 50, such as a release button, it is determined that photography is executed. In step S108, if it is determined that photography is executed, the process advances to step S109. In step S108, if it is determined that photography is not executed, the process of FIG. 4 is terminated. In this case, the process advances to step S12 of FIG. 3.

In step S109, the controller 801 controls the imaging unit 10 so as to execute multiple times of imaging under different exposure conditions for recording. Images acquired by multiple times of imaging are stored in the temporary storage 803. After the end of multiple times of imaging, the process advances to step S110. As illustrated in FIG. 5, in the HDR photography process, after an instruction for photography is given, imaging of "exposure A", which is an exposure condition of over-exposure relative to proper exposure, and imaging of "exposure B", which is an exposure condition of under-exposure relative to proper exposure, are executed. The exposure condition of proper exposure at a time when the instruction for photography is given is determined based on the result of AE immediately before the instruction for photography is given. A variation amount of the shutter speed for the proper exposure is, for example, a fixed value. Alternatively, a variation amount of the shutter speed for the proper exposure is, for example, a value which is set in a setting change.

In step S110, the controller 801 requests the image processing device 802 to execute HDR image synthesis of the images acquired by multiple times of imaging. Responding to the request, the image synthesis unit 8022a of the image processing device 802 executes HDR image synthesis. HDR image synthesis for recording is executed like the HDR image synthesis for live view display. After the image synthesis, the controller 801 requests the image processing device 802 to execute image processes for recording. Responding to the request, the image processor 8022 of the image processing device 802 executes the image processes for recording, such as a white balance correction process, a gamma correction process, a color correction process, a noise reduction process, a resize process and a compression process. Thereafter, the process advances to step S111.

In step S111, the controller 801 requests the image processing device 802 to record a synthesis image file. Responding to the request, the file generator 8023 of the image processing device 802 generates additional information of the synthesis image file. Thereafter, the process advances to step S112. The additional information of the synthesis image file in the HDR photography process includes information of a file name of the synthesis image file. In addition, the additional information of the synthesis image file includes information of the acquisition date/time of the synthesis image file (the date/time of generation of the file). Further, the additional information of the synthesis image file includes image information of each of images used for image synthesis. This image information includes the acquisition date/time of the image, and imaging conditions of the image (sensitivity, shutter speed, aperture value). The image information may include other information. The additional information of the synthesis image file in the HDR photography process includes information indicating that scenes are identical, as information of identity of scenes of images used for image synthesis. Furthermore, the additional information of the synthesis image file in the HDR photography process includes information indicating that images were acquired by serial imaging, as information relating to the seriality of images used for image synthesis.

In step S112, the file generator 8023 generates a synthesis image file. Then, the record controller 8024 records the synthesis image file in the recording medium 40. In addition, when such setting is made as to leave images used for image synthesis, the file generator 8023 generates an image file from each of the images used for image synthesis. Then, the record controller 8024 records the image file in the recording medium 40. Thereafter, the process of FIG. 4 is finished. In this case, the process advances to step S12 of FIG. 3.

FIG. 7 is a view illustrating an example of a synthesis image file which is generated by the HDR photography process. As illustrated in FIG. 7, in the synthesis image file, an HDR image (synthesis image) generated by the HDR image synthesis is recorded in a compressed state. In addition, a thumbnail of the HDR image is recorded in the synthesis image file. This thumbnail is used, for example, when a table of files is displayed at a time of playback of images. Further, in the synthesis image file, as the above-described additional information, the acquisition date/time of the synthesis image file, image information of images used for image synthesis (FIG. 7 illustrating an example in which images used for image synthesis are two images, namely an image A and an image B), information of identity of scenes, and information of seriality of images are recorded. Besides, when setting is made to record, as image files, the original images themselves which are used for HDR image synthesis, file names or the like of the original image files of the images used for HDR image synthesis may be recorded as additional information.

Here, as described above with reference to FIG. 2, the HDR image synthesis is classified as the A-type process which is the image synthesis of images acquired during serial imaging of an identical scene. The relationship between such plural images can be discriminated from the information of identity of scenes and the information of seriality of images. Conversely, if it is understood that the synthesis image file is generated by the HDR photography process, it is discriminated that the images used for image synthesis are images acquired during serial imaging of an identical scene, even without the information of identity of scenes and the information of seriality of images. Accordingly, when information indicating that the synthesis image file is generated by the HDR photography process is recorded in the synthesis image file, the information of identity of scenes and the information of seriality of images may not be recorded.

The above-described generation of the synthesis image file in the HDR photography process is applicable to other photography processes classified into the A-type process, for example, the depth synthesis process and field sequential image synthesis process, except that synthesis images which are recorded are different.

Figure 8:
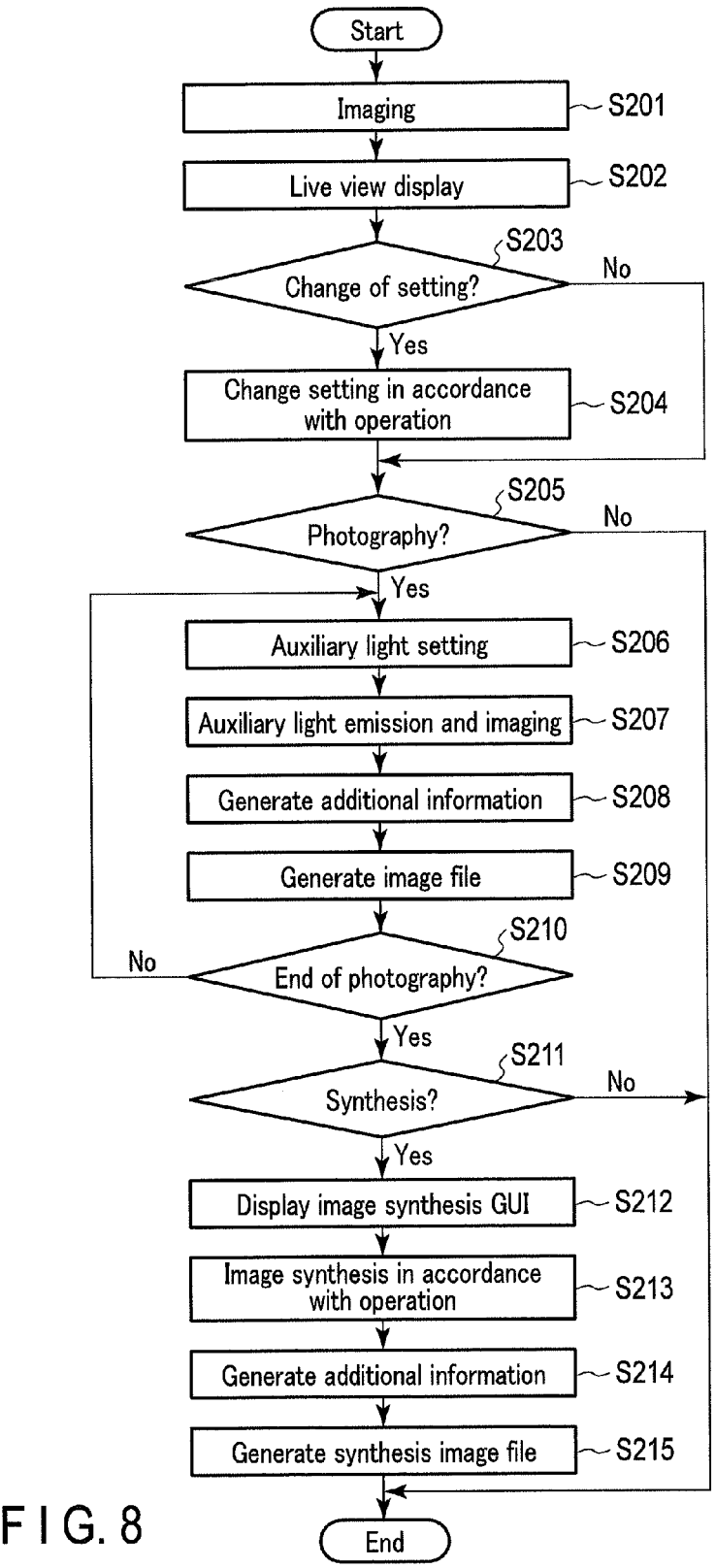
FIG. 8 is a flowchart illustrating an analysis photography process.

Next, the analysis photography process will be described. FIG. 8 is a flowchart illustrating the analysis photography process.

In step S201 after the start of the analysis photography process, the controller 801 controls the imaging unit 10 to execute imaging for live view display. After the end of imaging, the process advances to step S202.

In step S202, the controller 801 executes live view display. In the live view display, the controller 801 requests the image processing device 802 to execute image processes for display. After the image processes, the controller 801 causes the display 30 to display the image on which the image processes were executed. After the live view display, the process advances to step S203.

In step S203, the controller 801 determines whether an instruction to change the setting is given by the user's operation of the operation unit 50. In step S203, if it is determined that the instruction to change the setting is given, the process advances to step S204. In step S203, if it is determined that the instruction to change the setting is not given, the process advances to step S205.

In step S204, the controller 801 changes the setting relating to analysis photography in accordance with the user's operation of the operation unit 50. Thereafter, the process advances to step S205. The setting relating to analysis photography includes setting of the number of times of imaging, and setting of auxiliary light.

In step S205, the controller 801 determines whether or not to execute photography. For example, when an instruction for photography was given by the user's operation of the operation unit 50, it is determined that photography is executed. In step S205, if it is determined that photography is executed, the process advances to step S206. In step S205, if it is determined that photography is not executed, the process of FIG. 8 is terminated. In this case, the process advances to step S12 of FIG. 3.

In step S206, the controller 801 executes, for the auxiliary light emitting unit 20, the setting of auxiliary light which is to be emitted. After the setting of auxiliary light, the process advances to step S207.

In step S207, the controller 801 controls the imaging unit 10 such that imaging is executed in synchronism with the emission of auxiliary light by the auxiliary light emission unit 20. The exposure condition of proper exposure at a time when the instruction for photography is given is determined based on the result of AE immediately before the instruction for photography is given. Images acquired by imaging are stored in the temporary storage 803. After the end of imaging, the controller 801 requests the image processing device 802 to execute image processes for recording. Responding to the request, the image processor 8022 of the image processing device 802 executes the image processes for recording. Thereafter, the process advances to step S208.

In step S208, the controller 801 requests the image processing device 802 to record an image file. Responding to the request, the file generator 8023 of the image processing device 802 generates additional information of the image file. Thereafter, the process advances to step S209. The additional information of the image file before the synthesis in the analysis photography process includes information of a file name of the image file. In addition, the additional information of the image file includes image information. The image information includes an acquisition date/time of the image, and imaging conditions of the image (sensitivity, shutter speed, aperture value, kind of auxiliary light). The image information may include other information.

In step S209, the file generator 8023 generates an image file. Then, the record controller 8024 records the image file in the recording medium 40. Thereafter, the process advances to step S210.

FIG. 9A is a view illustrating an example of the image file which is generated by the analysis photography process. As illustrated in FIG. 9A, in the image file, an image before image synthesis is recorded in a compressed state. In addition, a thumbnail of the image is recorded in the image file. Further, in the image file, as the above-described additional information, image information is recorded.

Referring back to FIG. 8, in step S210, the controller 801 determines whether or not to finish photography. For example, when an instruction to finish photography is given by the user's operation of the operation unit 50 or when the predetermined number of times of imaging are finished, it is determined that the photography is finished. In step S210, if it is determined that the photography is not finished, the process returns to step S206. In this case, photography is executed by changing auxiliary light. In step S210, if it is determined that the photography is finished, the process advances to step S211. At this time, the controller 801 resumes the live view display.

In step S211, the controller 801 determines whether an instruction for image synthesis is given by the user's operation of the operation unit 50. For example, when an operation member for image synthesis is operated, or when an instruction for image synthesis is given by the operation of the touch panel, it is determined that the instruction for image synthesis is given. In step S211, when it is determined that the instruction for image synthesis is given, the process advances to step S212. In step S211, when it is determined that the instruction for image synthesis is not given, the process of FIG. 8 is terminated. In this case, the process advances to step S12 of FIG. 3.

Figure 10A:
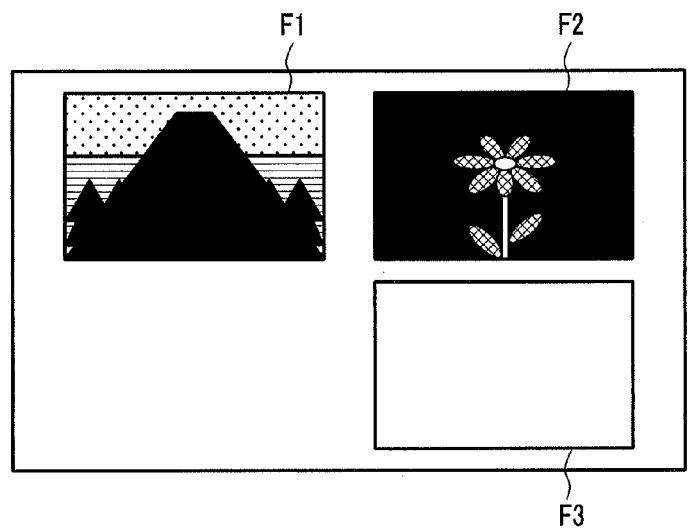
FIG. 10A is a view illustrating a state of a Graphical User Interface (GUI) for image synthesis before image synthesis is executed.
Figure 10B:
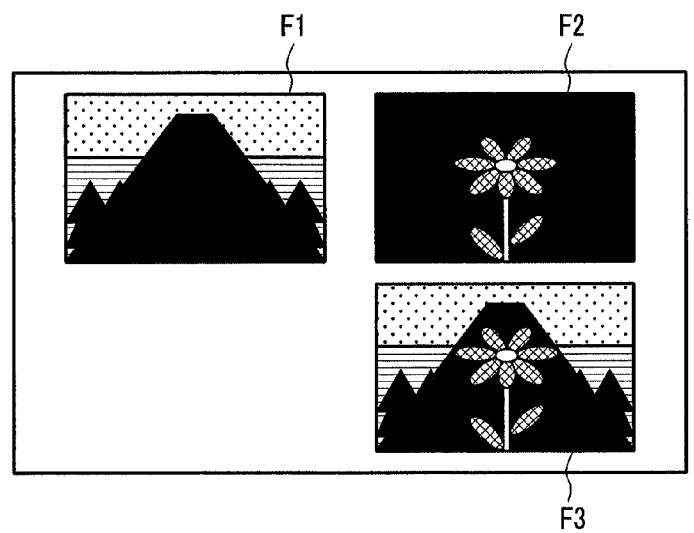
FIG. 10B is a view illustrating a state of the GUI for image synthesis after image synthesis is executed.

In step S212, the controller 801 causes the display 30 to display a GUI for image synthesis. Thereafter, the process advances to step S213. FIG. 10A and FIG. 10B are views illustrating examples of the GUI for image synthesis. FIG. 10A is a view illustrating a state of the GUI before image synthesis is executed, and FIG. 10B is a view illustrating a state of the GUI after image synthesis is executed. As illustrated in FIG. 10A and FIG. 10B, the GUI for image synthesis includes display frames F1 and F2 of material images serving as materials of image synthesis, and a display frame F3 of a synthesis image which is generated as a result of the image synthesis.

In step S213, the controller 801 requests the image processing device 802 to execute image synthesis according to the user's operation on the GUI. Responding to the request, the image synthesis unit 8022a of the image processing device 802 executes image synthesis. In the image synthesis in the analysis photography process, if the user touches either the display frame F1 or display frame F2, the controller 801 causes the display 30 to display a screen for selecting image files. If the user selects image files for use in image synthesis from this screen, the controller 801 causes the thumbnail of the selected image file to be displayed within the display frame touched by the user, as illustrated in FIG. 10A. Then, when thumbnails are displayed in both the display frames F1 and F2, i.e. when the selection of image files for use in image synthesis is completed, the image synthesis unit 8022a synthesizes the images recorded in the selected image files. The synthesis is executed in a manner to align the positions of the selected images. Thereby, in the analysis photography process, a synthesis image, which is similar to an image in which fluorescences of different phosphors are simultaneously emitted, is generated. After the completion of image synthesis, the controller 801 causes the thumbnail of the synthesis image to be displayed on the display frame F3, as illustrated in FIG. 10B. In addition, after the image synthesis, the controller 801 requests the image processing device 802 to execute image processes for recording. Responding to the request, the image processor 8022 of the image processing device 802 executes the image processes for recording, such as a white balance correction process, a gamma correction process, a color correction process, a noise reduction process, a resize process and a compression process. Thereafter, the process advances to step S214.

In step S214, the controller 801 requests the image processing device 802 to record a synthesis image file. Responding to the request, the file generator 8023 of the image processing device 802 generates additional information of the synthesis image file. Thereafter, the process advances to step S215. The additional information of the synthesis image file in the analysis photography process includes information of a file name of the synthesis image file. In addition, the additional information of the synthesis image file includes information of the acquisition date/time of the synthesis image file (the date/time of generation of the file). Further, the additional information of the synthesis image file includes image information of each of image files used for image synthesis. This image information includes file names and acquisition dates/times of the image files in which the corresponding images are recorded. By recording the file names and acquisition dates/times of the image files, the information of the image files, in which the images used for synthesis are recorded, can be presented to the user. By presenting the information, such a use can be conceivable that the original images used for synthesis are used for other image synthesis. Note that, like the synthesis image file in the HDR photography process, the imaging conditions of the respective images may be recorded as image information.

Besides, the additional information of the synthesis image file in the analysis photography process includes information indicating that scenes are identical, as information of identity of scenes of the images used for image synthesis. Furthermore, the additional information of the synthesis image file in the analysis photography process includes information indicating that the images were acquired by independent imagings, as information relating to the seriality of the images used for image synthesis.

In step S215, the file generator 8023 generates a synthesis image file. Then, the record controller 8024 records the synthesis image file, in the recording medium 40. Thereafter, the process of FIG. 8 is finished. In this case, the process advances to step S12 of FIG. 3.

Figure 9B:
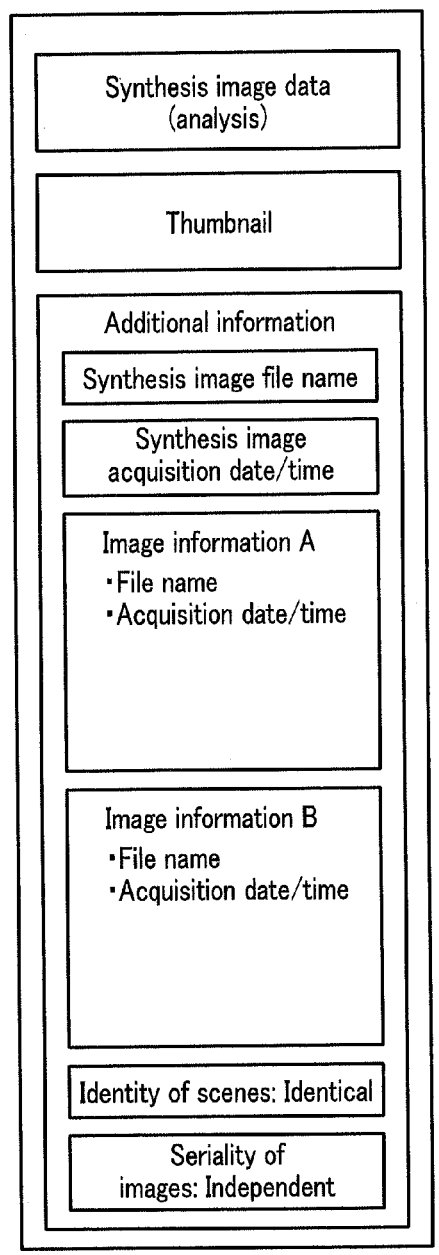
FIG. 9B is a view illustrating an example of a synthesis image file which is generated by the analysis photography process.

FIG. 9B is a view illustrating an example of a synthesis image file which is generated by the analysis photography process. As illustrated in FIG. 9B, in the synthesis image file, a synthesis image generated by the image synthesis of the analysis photography process is recorded in a compressed state. In addition, a thumbnail of the synthesis image is recorded in the synthesis image file. This thumbnail is used, for example, when a table of files is displayed at a time of playback of images. Further, in the synthesis image file, as the above-described additional information, the acquisition date/time of the synthesis image file, image information of images used for image synthesis (FIG. 9B illustrating an example in which images used for image synthesis are two images, namely an image A and an image B), information of identity of scenes, and information of seriality of images are recorded.

Here, as described above with reference to FIG. 2, the image synthesis in the analysis photography process is classified as the B-type process which is the image synthesis of images acquired during independent imagings of an identical scene. The relationship between such plural images can be discriminated from the information of identity of scenes and the information of seriality of images. Conversely, if it is understood that the synthesis image file is generated by the analysis photography process, it is discriminated that the images used for image synthesis are images acquired during independent imagings of an identical scene, even without the information of identity of scenes and the information of seriality of images. Accordingly, when information indicating that the synthesis image file is generated by the analysis photography process is recorded in the synthesis image file, the information of identity of scenes and the information of seriality of images may not be recorded.

In addition, in the example of FIG. 8, images acquired by multiple times of imaging, with the wavelength of auxiliary light being changed on an imaging-by-imaging basis, are synthesized. On the other hand, a plurality of wavelengths may be simultaneously radiated on the object, the wavelengths of reflective light from the object may be separated, and a plurality of necessary images for image synthesis may be generated. The number of times of imaging in this case may be one.

The above-described generation of the synthesis image file in the analysis photography process is applicable to other photography processes classified into the B-type process, except that synthesis images which are recorded are different.

Figure 11:
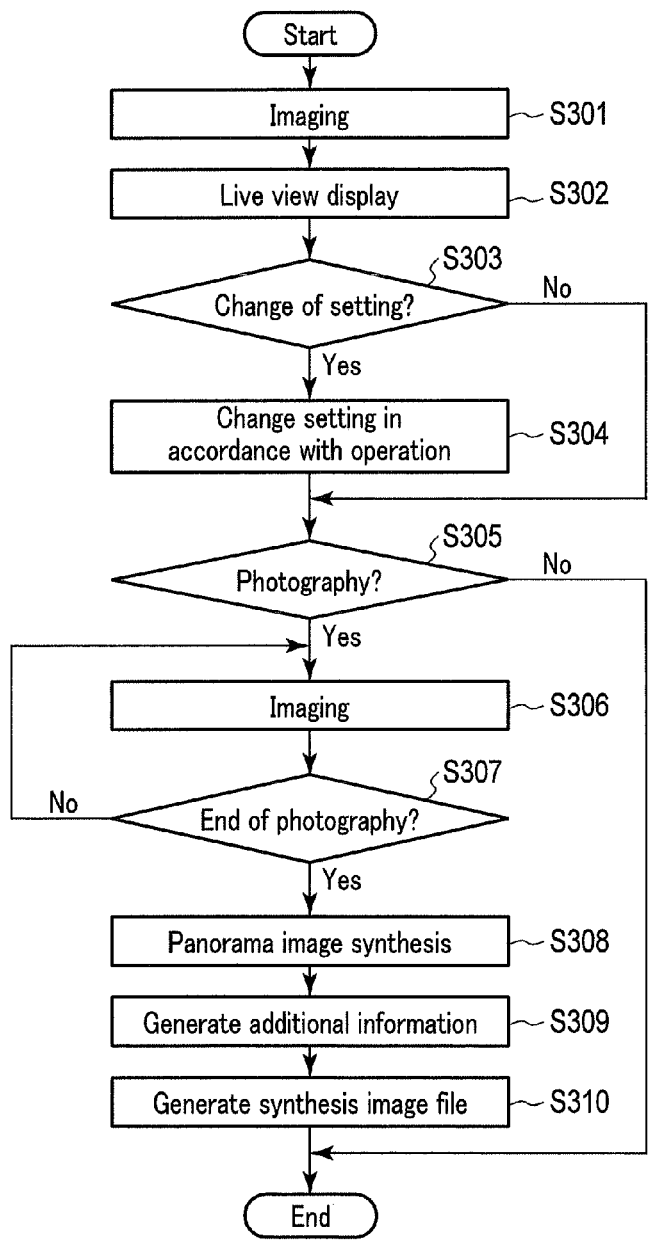
FIG. 11 is a flowchart illustrating a panorama photography process.

Next, the panorama photography process will be described. FIG. 11 is a flowchart illustrating the panorama photography process.

In step S301 after the start of the panorama photography process, the controller 801 controls the imaging unit 10 to execute imaging for live view display. After the end of imaging, the process advances to step S302.

In step S302, the controller 801 executes live view display. In the live view display, the controller 801 requests the image processing device 802 to execute image processes for display. After the image processes, the controller 801 causes the display 30 to display the image on which the image processes are executed. After the live view display, the process advances to step S303.

In step S303, the controller 801 determines whether an instruction to change the setting is given by the user's operation of the operation unit 50. In step S303, if it is determined that the instruction to change the setting is given, the process advances to step S304. In step S303, if it is determined that the instruction to change the setting is not given, the process advances to step S305.

In step S304, the controller 801 changes the setting relating to panorama photography in accordance with the user's operation of the operation unit 50. Thereafter, the process advances to step S305. The setting of recording of a panorama image includes, for example, setting as to whether or not to record, as image files, the original images themselves which are used for panorama image synthesis.

In step S305, the controller 801 determines whether or not to execute photography. For example, when an instruction for photography is given by the user's operation of the operation unit 50, it is determined that photography is executed. In step S305, if it is determined that photography is executed, the process advances to step S306. In step S305, if it is determined that photography is not executed, the process of FIG. 11 is terminated. In this case, the process advances to step S12 of FIG. 3.

In step S306, the controller 801 controls the imaging unit 10 such that imaging for recording is executed. The exposure condition of proper exposure at a time when the instruction for photography was given is determined based on the result of AE immediately before the instruction for photography is given. Images acquired by imaging are stored in the temporary storage 803.

In step S307, the controller 801 determines whether or not to finish photography. For example, when an instruction to finish photography is given by the user's operation of the operation unit 50, it is determined that the photography is finished. In step S307, if it is determined that the photography is not finished, the process returns to step S306. In this case, the next imaging is executed. In step S307, if it is determined that the photography is finished, the process advances to step S308. In the panorama photography mode, the user executes photography while moving the imaging device 1 in a fixed direction, and finishes the photography at a desired timing. From when the user instructs the start of photography to when the user instructs the end of photography, the imaging is repeatedly executed. Then, images acquired as the result of repeated imaging are successively stored in the temporary storage 803.

In step S308, the controller 801 requests the image processing device 802 to execute panorama image synthesis of the images acquired by multiple times of imaging. Responding to the request, the image synthesis unit 8022*a* of the image processing device 802 executes panorama image synthesis. The panorama synthesis is executed such that the acquired images are synthesized so as to be successively connected in accordance with the attitude of the imaging device 1. After the image synthesis, the controller 801 requests the image processing device 802 to execute image processes for recording. Responding to the request, the image processor 8022 of the image processing device 802 executes the image processes for recording, such as a white balance correction process, a gamma correction process, a color correction process, a noise reduction process, a resize process and a compression process. Thereafter, the process advances to step S309.

In step S309, the controller 801 requests the image processing device 802 to record a synthesis image file. Responding to the request, the file generator 8023 of the image processing device 802 generates additional information of the synthesis image file. Thereafter, the process advances to step S310. The additional information of the synthesis image file in the panorama photography process includes information of a file name of the synthesis image file. In addition, the additional information of the synthesis image file includes information of the acquisition date/time of the synthesis image file (the date/time of generation of the file). Further, the additional information of the synthesis image file includes image information of each of images used for image synthesis. This image information includes the acquisition dates/times of the images, and imaging conditions of the images (sensitivity, shutter speed, aperture value, attitude of the imaging device). The image information may include other information, or part of the image information may be omitted.

Besides, the additional information of the synthesis image file in the panorama photography process includes information indicating that scenes are different, as information of identity of scenes of the images used for image synthesis. Furthermore, the additional information of the synthesis image file in the panorama photography process includes information indicating that the images are acquired by serial imaging, as information relating to the seriality of the images used for image synthesis.

In step S310, the file generator 8023 generates a synthesis image file. Then, the record controller 8024 records the synthesis image file in the recording medium 40. In addition, when such setting is made as to leave images used for image synthesis, the file generator 8023 generates an image file from each of the original images used for image synthesis. Then, the record controller 8024 records the image file in the recording medium 40. Thereafter, the process of FIG. 11 is finished. In this case, the process advances to step S12 of FIG. 3.

Figure 12:
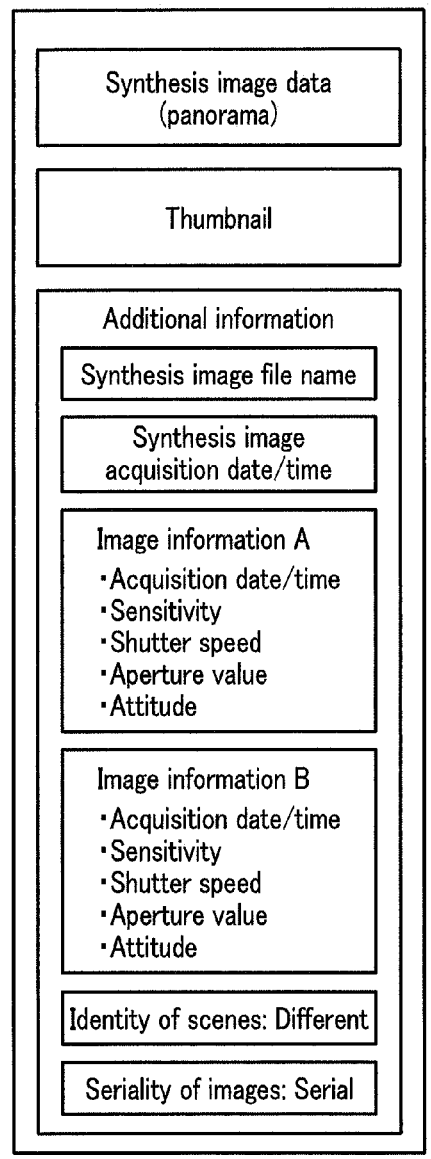
FIG. 12 is a view illustrating an example of a synthesis image file which is generated by the panorama photography process.

FIG. 12 is a view illustrating an example of a synthesis image file which is generated by the panorama photography process. As illustrated in FIG. 12, in the synthesis image file, a panorama image (synthesis image) generated by the panorama image synthesis is recorded in a compressed state. In addition, a thumbnail of the panorama image is recorded in the synthesis image file. This thumbnail is used, for example, when a table of files is displayed at a time of playback of images. Further, in the synthesis image file, as the above-described additional information, the acquisition date/time of the synthesis image file, image information of images used for image synthesis (FIG. 12 illustrating an example in which images used for image synthesis are two images, namely an image A and an image B), information of identity of scenes, and information of seriality of images are recorded. Besides, when setting is made to record, as image files, the original images themselves which are used for panorama image synthesis, file names or the like of the image files of the original images used for panorama image synthesis may be recorded as additional information.

Here, as described above with reference to FIG. 2, the panorama image synthesis is classified as the C-type process which is the image synthesis of images acquired during serial imaging of different scenes. The relationship between such plural images can be discriminated from the information of identity of scenes and the information of seriality of images. Conversely, if it is understood that the synthesis image file is generated by the panorama photography process, it is discriminated that the plural images are images acquired during serial imaging of different scenes, even without the information of identity of scenes and the information of seriality of images. Accordingly, when information indicating that the synthesis image file are generated by the panorama photography process is recorded in the synthesis image file, the information of identity of scenes and the information of seriality of images may not be recorded.

The above-described generation of the synthesis image file in the panorama photography process is applicable to other photography processes classified into the C-type process, for example, a multiple exposure image synthesis process, except that synthesis images which are recorded are different.

Next, the composite photograph generation process will be described. FIG. 13 is a flowchart illustrating the composite photograph generation process. In addition, FIG. 14 is a timing chart during the composite photograph generation process. FIG. 14 shows, from above, the timing of imaging, an image acquired by each imaging, a combination of images used for image synthesis, and a composite photograph image acquired by image synthesis.

In the composite photograph generation process, a material image is acquired in advance prior to the composite photograph generation process which is executed at a timing later than a dot-and-dash line in FIG. 14. Photography for acquiring the material image may be the above-described photography of the normal photography mode, or may be the photography of the HDR photography mode, analysis photography mode, panorama photography mode, or a composite photograph generation mode that is described below.

In step S401 after the start of the composite photograph generation process, the controller 801 determines whether the material image is selected or not. The controller 801 causes the display 30 to display a screen for selecting an image file. The user selects, from this screen, an image file of the material image which is used for image synthesis. Responding to the selection, the controller 801 determines in step S401 that the material image is selected. In step S401, if it is determined that the material image is selected, the process advances to step S402. In step S401, if it is determined that the material image is not selected, the process of FIG. 13 is terminated. In this case, the process advances to step S12 of FIG. 3.

In step S402, the controller 801 requests the image processing device 802 to generate a semitransparent image of the image selected by the user. Responding to the request, the image processor 8022 of the image processing device 802 generates a semitransparent image. Thereafter, the process advances to step S403. The generation of the semitransparent image is executed, for example, by setting a synthesis ratio to a value that is greater than 0 and less than 1, the synthesis ratio being a ratio to the image for live view display which will be described later. The synthesis ratio at the time of live view display may be a fixed value or may be set by the user in the setting change which will be described later.

In step S403, the controller 801 controls the imaging unit 10 to execute imaging for live view display. After the end of imaging, the process advances to step S404.

In step S404, the controller 801 requests the image processing device 802 to execute image synthesis. Responding to the request, the image synthesis unit 8022a of the image processing device 802 executes synthesis between the selected material image and a synthesis-target image acquired by the imaging for live view display. Thereafter, the process advances to step S405. FIG. 15 is a view illustrating an example of the image synthesis for composite photograph generation. In the image synthesis for composite photograph generation, a material image B2 is synthesized with a synthesis-target image A2 in accordance with a synthesis ratio. FIG. 15 illustrates an example in which the synthesis ratio of the material image to the synthesis-target image=1:0. In this case, a composite photograph image C2, in which a partial area of the synthesis-target image A2 is replaced with the material image B2, is generated. Note that at the time of live view display, since the synthesis ratio of the material image is set to be less than 1, a synthesis live view (LV) image, in which a semitransparent material image is synthesized with a synthesis-target image, is generated. By displaying the synthesis LV image in which the semitransparent material image is synthesized, the user can confirm the result of the synthesis process on the live view display.

In step S405, the controller 801 requests the image processing device 802 to execute image processes on the composite photograph image. After the image processes, the controller 801 causes the display 30 to display the image on which the image processes are executed. After the live view display, the process advances to step S406.

In step S406, the controller 801 determines whether an instruction to change the setting is given by the user's operation of the operation unit 50. For example, when an operation member for the change of setting is operated, it is determined that the instruction to change the setting is given. In step S406, if it is determined that the instruction to change the setting is given, the process advances to step S407. In step S406, if it is determined that the instruction to change the setting is not given, the process advances to step S408.

In step S407, the controller 801 changes the setting relating to composite photograph generation in accordance with the user's operation of the operation unit 50. Thereafter, the process advances to step S408. The setting relating to composite photograph generation includes setting of the synthesis ratio, and setting of recording of a composite photograph image. The setting of recording of a composite photograph image includes, for example, setting as to whether a synthesis-target image itself, which is used for image synthesis for composite photograph generation, is also recorded as an image file, and setting as to whether additional information generated at the time of composite photograph generation is also written in the image file of the material image.

In step S408, the controller 801 determines whether or not to execute photography. For example, when an instruction for photography is given by the user's operation of the operation unit 50, it is determined that photography is executed. In step S408, if it is determined that photography is executed, the process advances to step S409. In step S408, if it is determined that photography is not executed, the process of FIG. 13 is terminated. In this case, the process advances to step S12 of FIG. 3.

In step S409, the controller 801 controls the imaging unit 10 such that imaging for recording is executed. The exposure condition of proper exposure at a time when the instruction for photography is given is determined based on the result of AE immediately before the instruction for photography is given. The image acquired by imaging is stored in the temporary storage 803.

In step S410, the controller 801 requests the image processing device 802 to execute image synthesis for recording the composite photograph image. Responding to the request, the image synthesis unit 8022a of the image processing device 802 synthesizes the selected material image and the synthesis-target image acquired by the imaging for recording. The image synthesis for recording is executed like the image synthesis for live view display. After the image synthesis, the controller 801 requests the image processing device 802 to execute image processes for recording. Responding to the request, the image processor 8022 of the image processing device 802 executes the image processes for recording, such as a white balance correction process, a gamma correction process, a color correction process, a noise reduction process, a resize process and a compression process. Thereafter, the process advances to step S411.

In step S411, the controller 801 requests the image processing device 802 to record a synthesis image file. Responding to the request, the file generator 8023 of the image processing device 802 generates additional information of the synthesis image file. Thereafter, the process advances to step S412. The additional information of the synthesis image file in the composite photograph generation process includes information of a file name of the synthesis image file. In addition, the additional information of the synthesis image file includes information of the acquisition date/time of the synthesis image file (the date/time of generation of the file). Further, the additional information of the synthesis image file includes image information of each of images used for image synthesis. The image information of the synthesis-target image includes the acquisition date/time of the image, and imaging conditions of the image (sensitivity, shutter speed, aperture value). On the other hand, the image information of the material image includes the file name of the image file in which the corresponding image is recorded, and the acquisition date/time of the image file. By recording the file name and acquisition date/time of the image file, the information of the image file, in which the image used for synthesis is recorded, can be presented to the user. By presenting the information, such a use can be conceivable that the image used for synthesis is used for other image synthesis. Note that the image information of the material image may include the acquisition date/time of the image file, and imaging conditions of the image (sensitivity, shutter speed, aperture value).

Besides, the additional information of the synthesis image file in the composite photograph generation process includes information indicating that scenes are different, as information of identity of scenes of the images used for image synthesis. Furthermore, the additional information of the synthesis image file in the composite photograph generation process includes information indicating that the images are acquired by independent imagings, as information relating to the seriality of the images used for image synthesis.

In step S412, the file generator 8023 generates a synthesis image file. Then, the record controller 8024 records the synthesis image file in the recording medium 40. Thereafter, the process of FIG. 13 is finished. In this case, the process advances to step S12 of FIG. 3.

FIG. 16 is a view illustrating an example of a synthesis image file which is generated by the composite photograph generation process. As illustrated in FIG. 16, in the synthesis image file, a synthesis image generated by the image synthesis of the composite photograph generation process is recorded in a compressed state. In addition, a thumbnail of the synthesis image is recorded in the synthesis image file. This thumbnail is used, for example, when a table of files is displayed at a time of playback of images. Further, in the synthesis image file, as the above-described additional information, the acquisition date/time of the synthesis image file, image information of images used for image synthesis (FIG. 16 illustrating an example in which images used for image synthesis are two images, namely a synthesis-target image A and a material image B), information of identity of scenes, and information of seriality of images are recorded. Besides, when setting is made to record, as an image file, the synthesis-target image itself which is used for composite photograph generation, the file name or the like of the image file of the synthesis-target image may be recorded as additional information.

Here, as described above with reference to FIG. 2, the image synthesis in the composite photograph generation process is classified as the D-type process which is the image synthesis of images acquired by independent imagings of different scenes. The relationship between such plural images can be discriminated from the information of identity of scenes and the information of seriality of images. In the composite photograph generation process, the imaging scenes of plural images may be identical, and the plural images may be acquired during serial imaging. Thus, it is effective to record the information of identity of scenes and the information of seriality of images. Furthermore, in the composite photograph generation process, the file name of the image file used for image synthesis is recorded as image information. By recording this information, too, the synthesis image file and the image file used for image synthesis are associated.

The above-described generation of the synthesis image file in the composite photograph generation process is applicable to other photography processes classified into the D-type process, except that synthesis images which are recorded are different.

As described above, according to the present embodiment, in the image processing device which can execute a plurality of kinds of image syntheses, the additional information indicative of the relationship between images used for image synthesis is recorded in the synthesis image file. By recording the additional information, the relationship between images used for image synthesis can be presented to, for example, the user. For example, by informing the user of the presence of the material image used for composite photograph generation, the user can generate a new composite photograph by using this material image. In this manner, the range of uses of the images used for image synthesis can be broadened.

[Modifications]

Figure 17A:
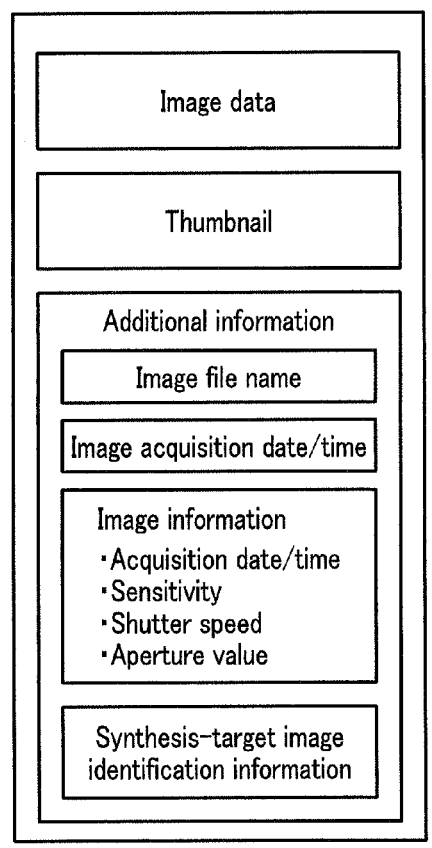
FIG. 17A is a view illustrating an example of an image file of a material image, in which additional information indicating a relationship of images used for image synthesis for composite photograph generation is recorded.
Figure 17B:
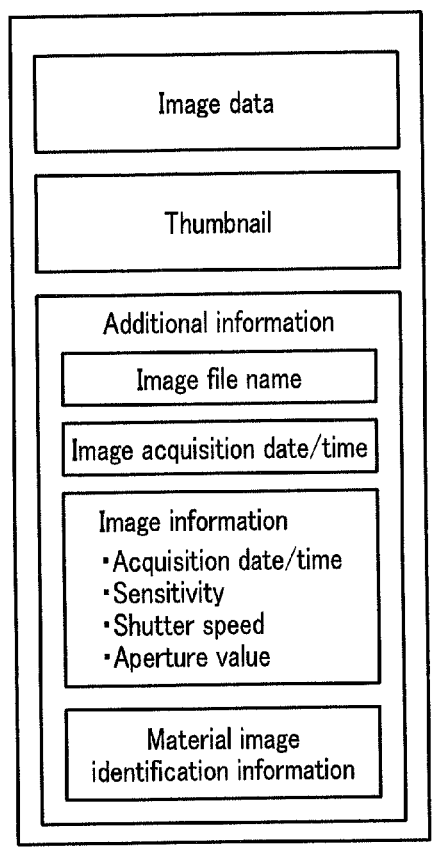
FIG. 17B is a view illustrating an example of an image file of a synthesis-target image, in which additional information indicating a relationship of images used for image synthesis for composite photograph generation is recorded.

Hereinafter, modifications of the present embodiment will be described. In the above-described embodiment, the additional information indicative of the relationship between images used for image synthesis is recorded in only the synthesis image file. On the other hand, the additional information indicative of the relationship between images used for image synthesis may be recorded in each of the image files used for image synthesis. FIG. 17A is a view illustrating an example of an image file (first image file) of a material image (first image), in which additional information indicating the relationship of images used for image synthesis for composite photograph generation is recorded. FIG. 17B is a view illustrating an example of an image file (second image file) of a synthesis-target image (second image), in which additional information indicating the relationship of images used for image synthesis for composite photograph generation is recorded. As illustrated in FIG. 17A, information (e.g. file name) for identifying the synthesis-target image is recorded as additional information of the image file of the material image. Similarly, as illustrated in FIG. 17B, information (e.g. file name) for identifying the material image is recorded as additional information of the image file of the synthesis-target image. Note that the additional information of each of the image files illustrated in FIG. 17A and FIG. 17B is merely an example, and may be changed as needed. For example, the file name and acquisition date/time of the synthesis image file may be recorded in the additional information of each of the synthesis-target image and material image. Besides, the information of identity of scenes to the associated image file and the information of seriality of images may be recorded in the additional information of each of the synthesis-target image and material image. Moreover, the file name of the material image may be changed so as to be associated with the synthesis image file.

In addition, although FIG. 17A and FIG. 17B illustrate the example of image files generated in the composite photograph generation process, the configuration that the additional information indicative of the relationship between images used for image synthesis is recorded in each of the image files used for image synthesis is similarly applicable to the HDR photography process, analysis photography process, and panorama photography process.

Here, there is a case in which an image file is protected in order to prevent edit of information. In this case, the additional information as illustrated in FIG. 17A and FIG. 17B cannot be added. Thus, as regards an image file which is protected, a copy of the image file, which is an image file in an unprotected state, may be once created, and the additional information may be added to the created copy of the image file.

The present invention has been described above, based on the embodiments. The invention, however, is not limited to the embodiments. Needless to say, various modifications and applications can be made within the scope of the spirit of the invention. For example, in the above-described embodiments, the image processing device is provided in the imaging device. However, it is not always necessary that the image processing device be provided in the imaging device. In addition, various image syntheses described above do not always need to be executed during photography, and may be executed, for example, at a time of edit after photography. Moreover, in the embodiments, the synthesis of two images is described, but the techniques of the embodiments are also applicable to the synthesis of three or more images.

Furthermore, in the embodiments, the part described as the "unit" or the like (section, unit, or the like) may be configured as a purpose-specific circuit or as a combination of general-purpose circuits. Where necessary, the "unit" or the like may be configured as processors such as a microprocessor and a CPU, which operate according to pre-programmed software, or may be combined with a sequencer. In addition, such design is possible as to assign part or all of the controls of the unit or the like to an external device. In this case, a wired or wireless communication circuit intervenes. Although a communication unit is not particularly described here for the purpose of simplicity, an embodiment may be assumed in which a characteristic process or an auxiliary process in the present application is executed by an external device such as a server or a personal computer. Specifically, the present application covers cases in which a plurality of devices cooperate to realize the features of the present invention. For the communication at this time, use is made of Bluetooth, Wi-Fi, and telephone networks. Besides, the communication at this time may be executed by a USB, etc. A purpose-specific circuit, a general-purpose circuit and a controller may be integrally constructed as an ASIC. The imaging device or system may be configured as a self-propelled one in order to photograph and synthesize different objects. At this time, a moving unit or the like for self-propelling is composed of various actuators, and coupling mechanisms for movement, as needed, and the actuators are operated by a driver circuit. This driver circuit, too, is controlled by a microprocessor, microcomputer, ASIC, etc. in accordance with a specific program. This control may be finely corrected and adjusted, based on the information which is output from various sensors and their peripheral circuits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising a processing circuit configured to:
   acquire a plurality of images;
   generate a synthesis image by synthesizing the images;
   generate a synthesis image file in which additional information indicative of a relationship between the images is recorded together with the synthesis image; and
   record the synthesis image file in a recording medium, wherein,
   when the images include a second image, the processing circuit records an acquisition date/time of a second image in the synthesis image file as the additional information, the second image being acquired during a serial process for generating the synthesis image file.

2. The image processing device of claim 1, wherein the processing circuit is further configured to:
   record a second image file in the recording medium, the second image file recording the second image, and
   record in the second image file additional information indicative of a relationship between the second image and an image other than the second image included in the images, which is used for generating the synthesis image.

3. An image processing device comprising a processing circuit configured to:
   acquire a plurality of images;
   generate a synthesis image by synthesizing the images;
   generate a synthesis image file in which additional information indicative of a relationship between the images is recorded together with the synthesis image; and
   record the synthesis image file in a recording medium, wherein,
   when the images include a first image, the processing circuit records additional information in a first image file, the first image file recording the first image, the first image being acquired at a timing independent from a serial process for generating the synthesis image file, and the information indicating a relationship between the first image and an image other than the first image included in the images.

4. The image processing device of claim 3, wherein the processing circuit is further configured to:
   create a copy of the first image file when the first image file is protected; and
   record, in the copy of the first image file, the additional information indicative of the relationship between the first image and the image other than the first image included in the images.

5. An image processing method comprising:
   acquiring a plurality of images;
   generating a synthesis image by synthesizing the images;
   generating a synthesis image file in which additional information indicative of a relationship between the images is recorded together with the synthesis image; and
   recording the synthesis image file in a recording medium, wherein,
   when the images include a second image, the recording the synthesis file includes recording an acquisition date/time of a second image in the synthesis image file as the additional information, the second image being acquired during a serial process for generating the synthesis image file.

6. A computer-readable, non-transitory recording medium which records an image processing program for causing a computer to execute:
   acquiring a plurality of images;
   generating a synthesis image by synthesizing the images;

generating a synthesis image file in which additional information indicative of a relationship between the images is recorded together with the synthesis image; and recording the synthesis image file in a recording medium, wherein, when the images include a second image, the recording the synthesis file includes recording an acquisition date/time of a second image in the synthesis image file as the additional information, the second image being acquired during a serial process for generating the synthesis image file.

7. An image processing method comprising:

acquiring a plurality of images;

generating a synthesis image by synthesizing the images;

generating a synthesis image file in which additional information indicative of a relationship between the images is recorded together with the synthesis image; and recording the synthesis image file in a recording medium, wherein, when the images include a first image, the image processing method records additional information in a first image file, the first image file recording the first image, the first image being acquired at a timing independent from a serial process for generating the synthesis image file, and the information indicating a relationship between the first image and an image other than the first image included in the images.

8. A computer-readable, non-transitory recording medium which records an image processing program for causing a computer to execute:

acquiring a plurality of images;

generating a synthesis image by synthesizing the images;

generating a synthesis image file in which additional information indicative of a relationship between the images is recorded together with the synthesis image; and recording the synthesis image file in a recording medium, wherein, when the images include a first image, the computer is caused to record additional information in a first image file, the first image file recording the first image, the first image being acquired at a timing independent from a serial process for generating the synthesis image file, and the information indicating a relationship between the first image and an image other than the first image included in the images.

* * * * *